(12) United States Patent
Verhagen (10) Patent No.: US 7,490,997 B2
(45) Date of Patent: Feb. 17, 2009

(54) INTEGRATED BEND LIMITER FOR FIBER OPTIC CONNECTORS

(76) Inventor: Robert Verhagen, Onderwüsboutevard 134, 5223DH Hertogenbosch (NL)

( * ) Notice: Subject to any disclaimer, the term of this patent is extended or adjusted under 35 U.S.C. 154(b) by 529 days.

(21) Appl. No.: 10/480,680

(22) PCT Filed: Jun. 12, 2002

(86) PCT No.: PCT/US02/18708

§ 371 (c)(1), (2), (4) Date: Aug. 9, 2004

(87) PCT Pub. No.: WO02/101436

PCT Pub. Date: Dec. 19, 2002

(65) Prior Publication Data

US 2004/0252949 A1    Dec. 16, 2004

(51) Int. Cl.
*G02B 6/36* (2006.01)

(52) U.S. Cl. .......................... 385/86; 385/78
(58) Field of Classification Search .................. 385/86, 385/78
See application file for complete search history.

(56) References Cited

U.S. PATENT DOCUMENTS

| | | | | |
|---|---|---|---|---|
| 5,037,175 A | * | 8/1991 | Weber | 385/76 |
| 5,073,044 A | * | 12/1991 | Egner et al. | 385/86 |
| 5,347,603 A | * | 9/1994 | Belenkiy et al. | 385/86 |
| 5,461,690 A | * | 10/1995 | Lampert | 385/100 |
| 5,579,425 A | * | 11/1996 | Lampert et al. | 385/59 |
| 5,710,851 A | * | 1/1998 | Walter et al. | 385/86 |
| 5,727,102 A | * | 3/1998 | Jeong et al. | 385/59 |
| 5,781,681 A | * | 7/1998 | Manning | 385/86 |
| 5,933,557 A | * | 8/1999 | Ott | 385/86 |
| 6,390,687 B1 | * | 5/2002 | Shirakawa | 385/86 |
| 6,554,489 B2 | * | 4/2003 | Kent et al. | 385/86 |
| 6,634,801 B1 | * | 10/2003 | Waldron et al. | 385/86 |

FOREIGN PATENT DOCUMENTS

| | | |
|---|---|---|
| DE | 44 12 571 | 6/1995 |
| DE | 195 31 633 | 7/1997 |

\* cited by examiner

*Primary Examiner*—Ellen Kim (57) ABSTRACT

A connector (10) comprising: a housing 11 having a front and rear orientation; a ferrule (12) disposed in the front of the housing and containing at least one fiber, a resilient member (13) disposed in the housing rearward of the ferrule (12); and a bendlimiter (14) disposed in the housing rearward of the resilient member, the bend limiter comprising a crimp portion (21) for interengaging the housing such that the bend limiter position with respect to the housing (11) is fixed, the crimp portion providing a backstop for compressing the resilient means (13) against the ferrule to urge the ferrule forward, the bend limiter also comprising an arcuate portion for dressing the fiber, the arcuate portion having a radius no less than the minimum bend radius of the fiber.

15 Claims, 9 Drawing Sheets

Fig. 1b

Proposed North / South Bend Limiter

LIGHTRAY MPX connector plug, with shortened inner and outer housing with east/west bend limiter

INTEGRATED BEND LIMITER FOR FIBER OPTIC CONNECTORS

FIELD OF THE INVENTION

The present invention relates to connectors for the use with optical fiber, and, more specifically, to connectors for optical backplane connector applications.

BACKGROUND OF TIE INVENTION

Optical fiber connectors are an essential part of substantially all optical fiber communication systems. For instance, optical connectors are used to join segments of fiber into longer lengths, to connect fiber to active devices such as radiation sources, detectors and repeaters, and to connect fiber to passive devices such as switches and attenuators. The principal function of an optical fiber connector is to hold a fiber end such that the core of the fiber is axially aligned with the optical path of the component to which the connector is mated (e.g., another fiber, a planar waveguide, or an opto-electric device). This way, light from the fiber is optically coupled to the other component.

Figure 7:
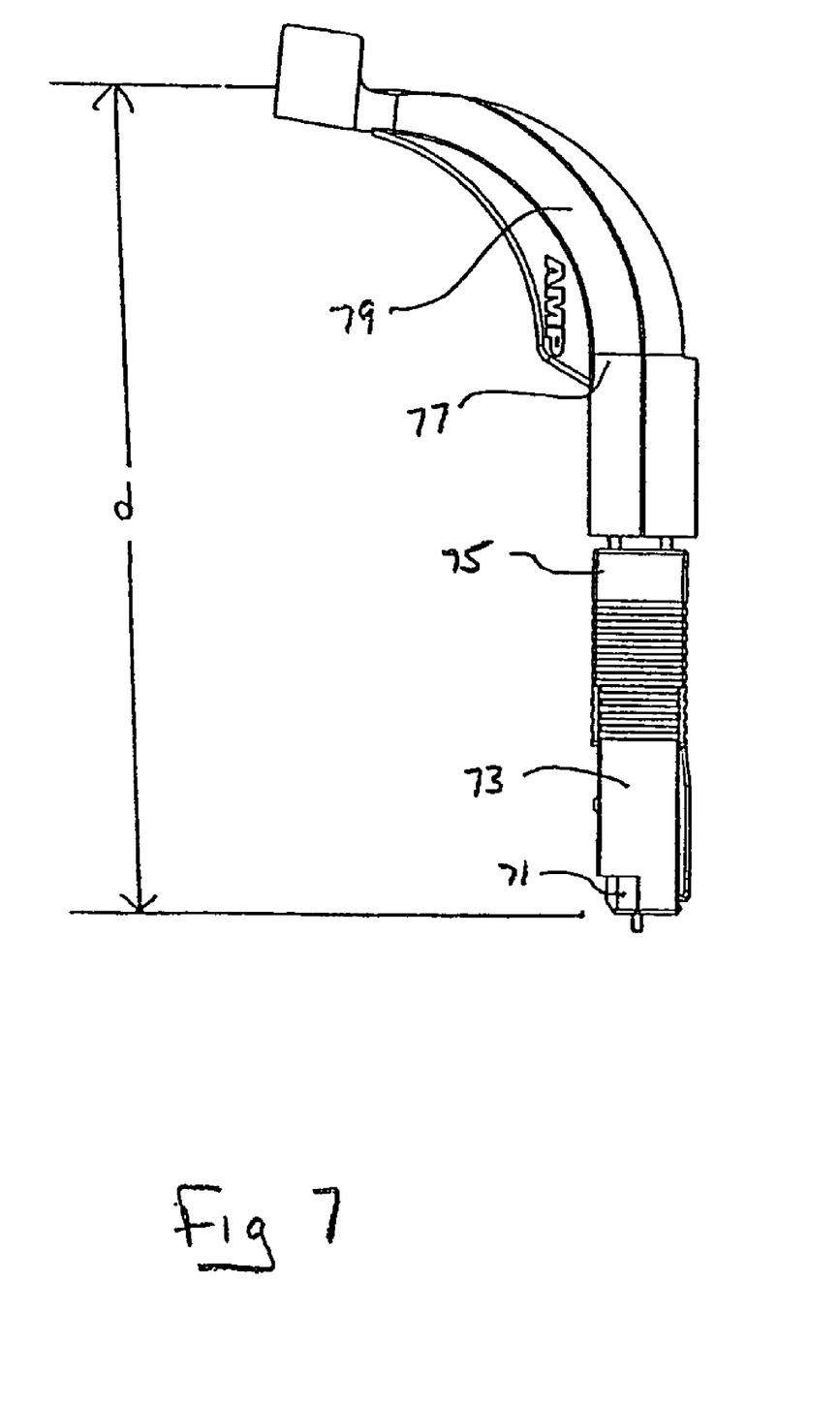
FIG. 7 is a perspective view of a typical blindmate backplane system using a Lightray MPX™ connector in accordance with the prior art.

One popular multi-fiber connector is the Lightray MPX™ connector by Tyco Electronics, Inc. (Harrisburg, Pa.). This connector is disclosed in U.S. Pat. No. 6,116,790 to Vergeest, which is incorporated herein by reference. A Lightray MPX™ connector is shown in FIG. 7. The connector comprises a multi-fiber ferrule 71 contained within a housing unit 73. A crimp member 75 is provided at the rear of the housing to secure the fiber optic cable to the connector. Upon mating, the front face of the multi-fiber ferrule 71 contacts the front face of a mating connector to join the fibers.

Figure 8:
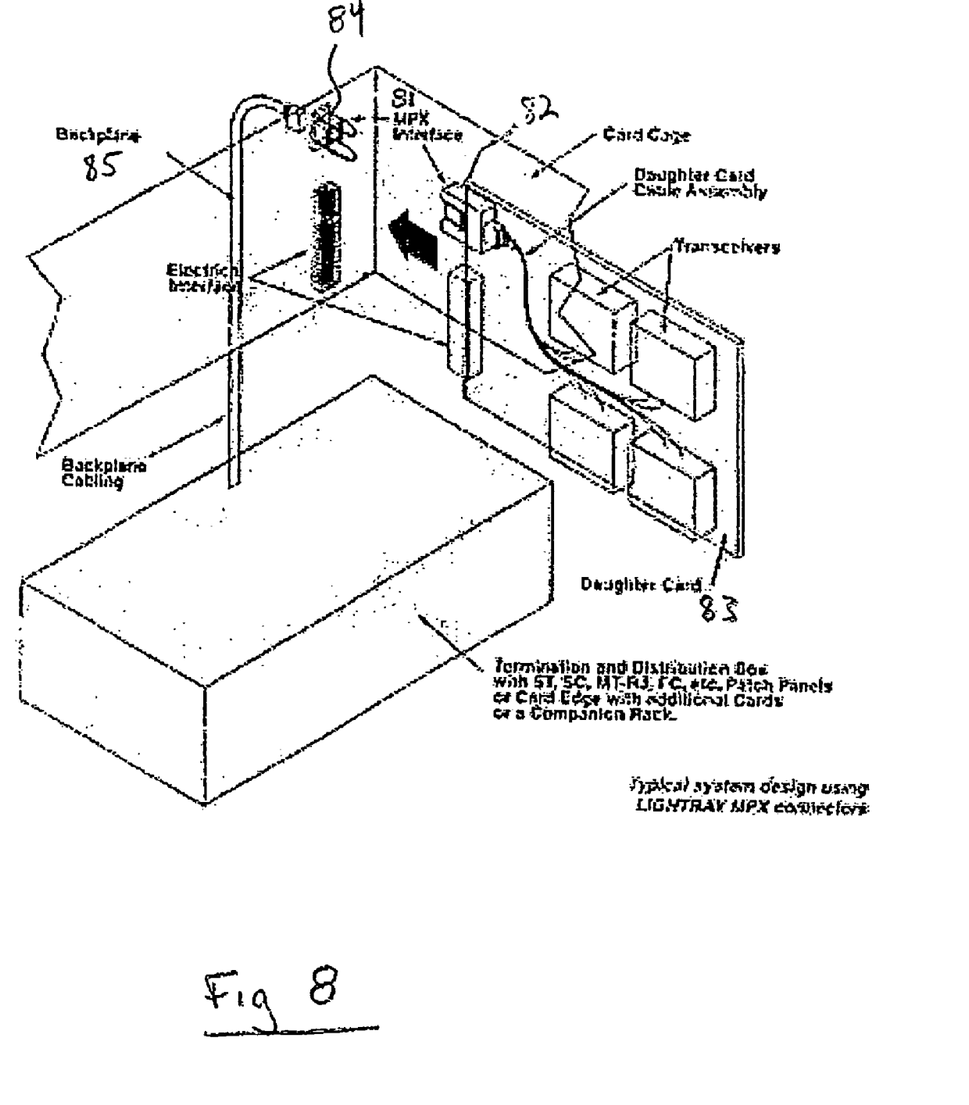
FIG. 8 is a side view of a Lightray MPX™ connector with a bend limiter attached in accordance with the prior art.

A popular configuration for the Lightray MPX™ connectors is a blind mate backplane system. FIG. 8 illustrates a blind mate backplane system utilizing a Lightray MPX™ connector 81. One connector 82 is located on a daughter card 83 with a mating connector 84 located on a motherboard or backplane 85. The connection process is a blind mate process, meaning the daughter card is inserted into an appropriate position on the backplane and the connection between the connectors is made without the need for the user to manipulate the connectors.

Typically, flexible fiber optic cable is used in blind mate fiber optic connector systems such as the one shown in FIG. 8. Flexible fiber optic cable has mechanical bending properties similar to copper wire cables; however, in order to maintain suitable performance, flexible fiber optic cable must not have any bends which exceed the minimum bend radius of the cable specification. Specifically, it is well known that as fiber optic cable is bent, there is a resulting loss in power. The loss in power increases as the bend radius decreases. Thus, there exists a minimum bend radius for every cable where a bend sharper than the minimum radius would create an unacceptable loss in power. The minimum bend radius varies depending on the cable type. A typical minimum bend radius for commonly used optical single mode fiber is approximately 25 mm (or 1 inch).

One commonly used method of preventing excessive bending is to employ a bend limiting device referred to as a bend limiter. A bend limiter is attached to the rear portion of an MPX connector plug to serve as a mechanical means of preventing the cable from bending too sharply. FIG. 7 illustrates an MPX connector in conjunction with a bend limiter. The bend limiter 77 is mounted to the rear crimp member 75 of the connector plug housing 73. The bend limiter 77 extends rearward from the crimp member 75 providing a guide path for the fiber optic cable to bend around, and insuring that the bend in the fiber does not exceed the minimum acceptable bend radius.

Many blindmate systems are used in enclosures where the space located behind the backplane is limited. Because of strict space constraints, it is often necessary to route the fiber optic cables to run parallel to the backplane. This requires a full 90° bend in the fiber path. To complete the full 90° bend desired using a Lightray MPX™ connector and a bend limiter, however, a certain amount of space behind the backplane is required. Referring again to FIG. 7, the fibers extend rearward from the front face of the ferrule 71 through the connector housing 73, through the crimp member 75, into the bend limiter 77, and around the controlled radius fiber path 79 of the bend limiter until the full 90° change in direction has been achieved. The total distance required behind the backplane is referred to as the effective connector length. The effective connector length is defined as the distance from the front face of the ferrule 71 to a line parallel with the front face of the ferrule and tangent to the arc radius of the curve at the point where the change in direction of the fiber is complete (shown as distance D on FIG. 7).

Despite the many advantages of the blind mate Lightray MPX™ connector system, occasionally its effective connector length proves to be excessive. Accordingly, there is a need for a blindmate connector system which controls fiber bend radius while minimizing effective connector length. The present invention fulfills this need among others.

SUMMARY OF THE INVENTION

The present invention provides for a connector comprising a bend limiter feature integrated into the connector itself. Specifically, rather than employing a discrete bend limiter as in the prior art, the connector of the present invention employs a bend limiter having a crimp member integrated in its front end. This configuration allows the fiber to begin bending immediately upon its exit from the rear of the ferrule. By beginning to bend the fiber more closely to the ferrule than has been done in prior art connectors, the effective connector length is reduced. Furthermore, since the bend limiter comprises the crimp member, the number of components is reduced in addition to the need to provide interconnection means between the crimp member and the bend limiter. This also serves to reduce effective connector length. Thus, the preferred embodiment of the present invention creates a space saving blind mate connector for back plane and other space sensitive applications.

One aspect of the present invention is a connector having an integral bend limiter feature. In a preferred embodiment, the connector comprises: (a) a housing having a front and rear oreintation; (b) a ferrule disposed in the front of the housing and containing at least one fiber, (c) a resilient member disposed in the housing rearward of the ferrule; and (d) a bend limiter disposed in the housing rearward of the resilient member, the bend limiter comprising a crimp portion for interengaging the housing such that the bend limiter position with respect to the housing is fixed, the crimp portion providing a backstop for compressing the resilient means against the ferrule to urge the ferrule forward, the bend limiter also comprising an arcuate portion for dressing the fiber, the arcuate portion having a radius no less than the minimum bend radius of the fiber.

BRIEF DESCRIPTION OF DRAWINGS

FIG. 1b is a perspective view of the connector of FIG. 1a.

FIG. 5 is a perspective view of a connector of the present invention shown in a mated condition.

DETAILED DESCRIPTION

Figure 1A:
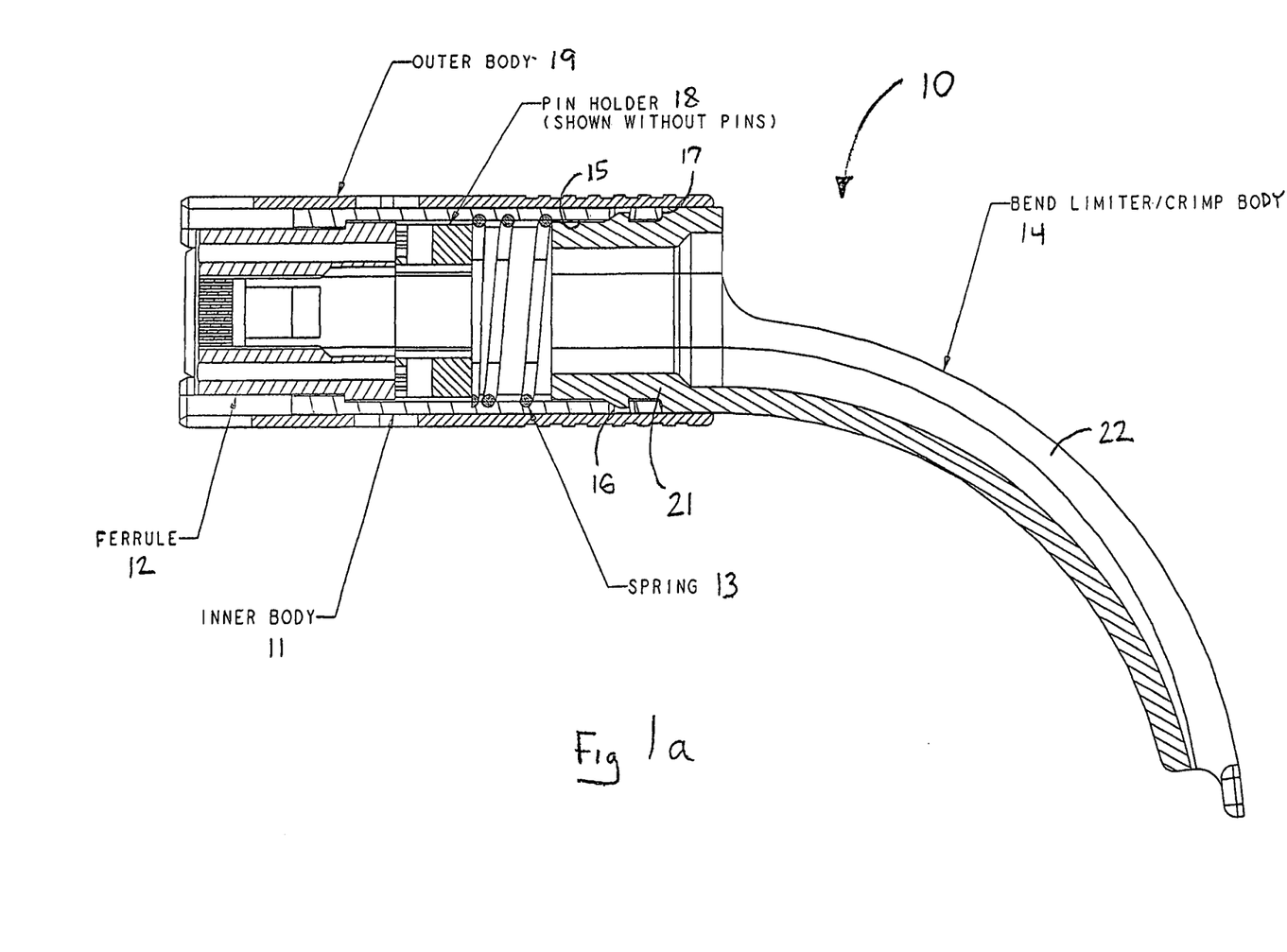
FIG. 1a is a cross-sectional view of a connector of the present invention.
Figure 1B:
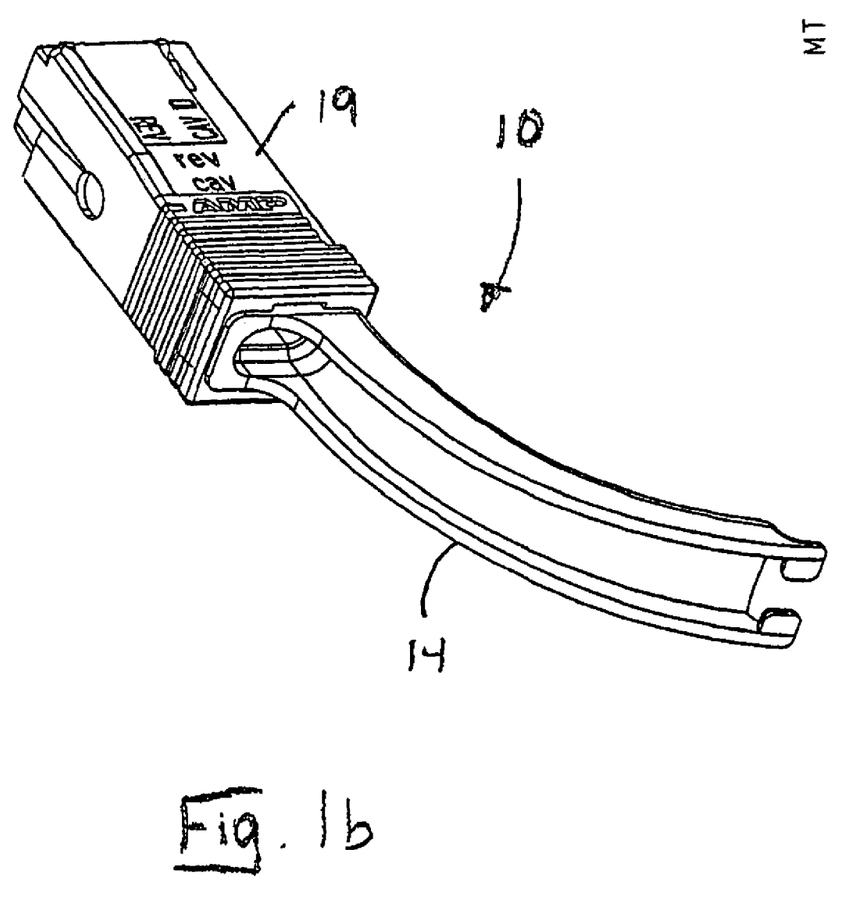

Referring to FIGS. 1(a) and (b), a preferred embodiment of fiber optic connector plug 10 of the present invention is shown. The illustrated connector is a Lightray MPX™ connector from Tyco Electronics (Harrisburg, Pa.), although the invention is not limited to this connector and may be practiced with other MT-type connectors such as the MPO- and MT-RJ-type connectors as well as non-MT connector types such as the SC-, FC-, and LC-type connectors.

The fiber optic connector plug 10 comprises: (a) a housing 11 having a front and rear orientation, (b) a ferrule 12 disposed in the housing toward the front and containing at least one fiber (not shown), (c) a resilient member 13 (e.g., a spring) disposed in the housing 11 rearward of the ferrule 12, and (d) a bend limiter 14 disposed in the housing 11 rearward of the resilient member 13. In an embodiment in which an MT ferrule is used, a pin keeper 18 between the ferrule and resilient member may be preferred. Additionally, in the case of a Lightray MPX™ connector, the connector 10 also comprises an outer housing 19 slidably connected to the housing 11. With the exception of the bend limiter 14, the detailed configuration of the components of the connector 10 and the connector's cooperation with a mating connector is disclosed in U.S. Pat. No. 6,116,790 to Vergeest and, thus, will not be considered herein in detail.

Figure 2A:
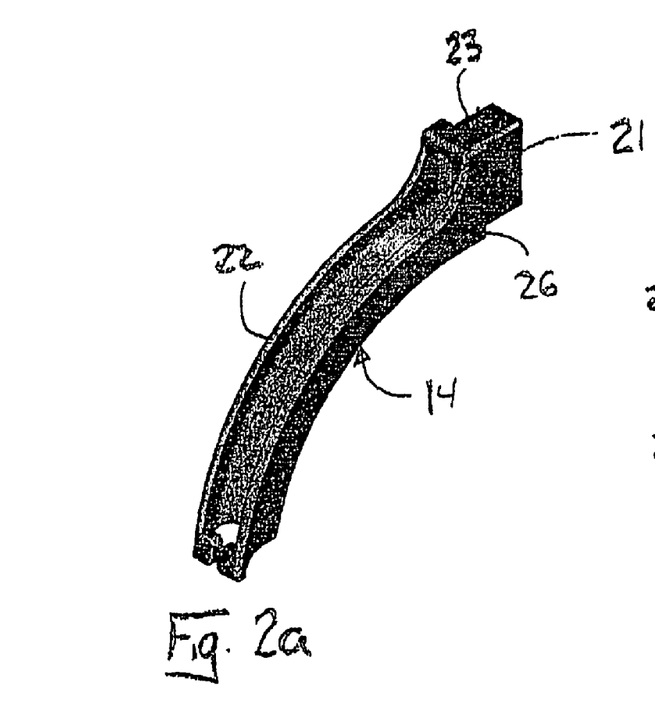
FIGS. 2a and 2b are different perspective views of a bend limiter portion of a connector of the present invention having an East/West configuration.
Figure 2B:
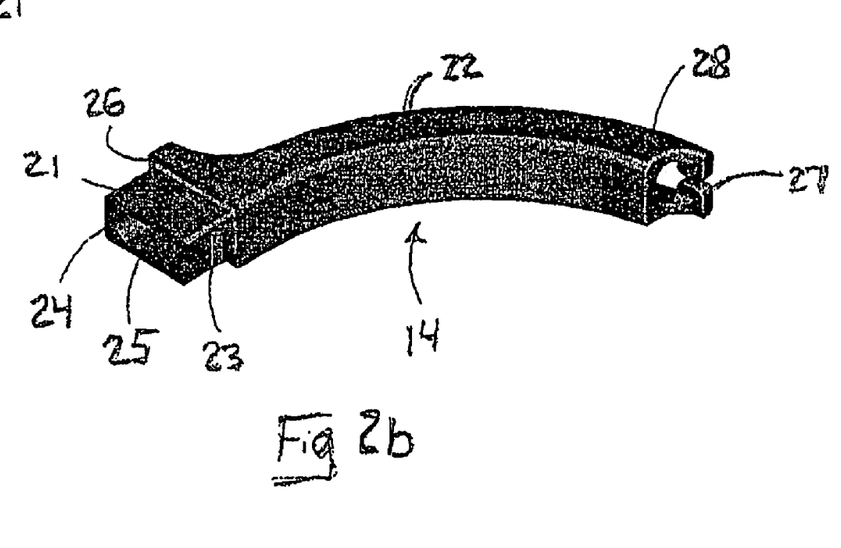
Figure 3A:
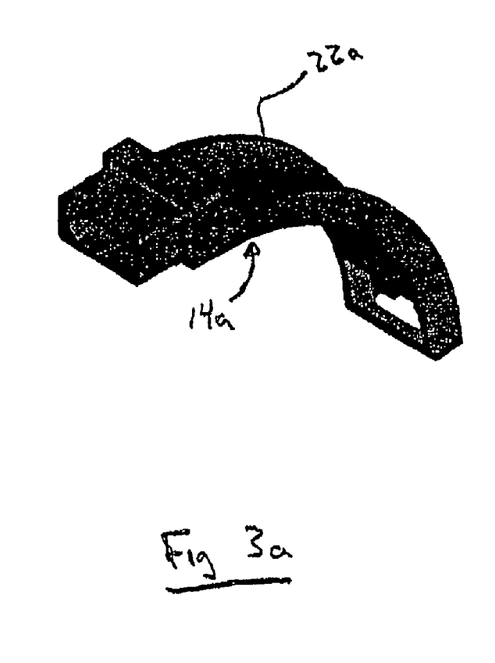
FIGS. 3a and 3b are different perspective views of a bend limiter portion of a connector of the present invention having a North/South configuration.
Figure 3B:
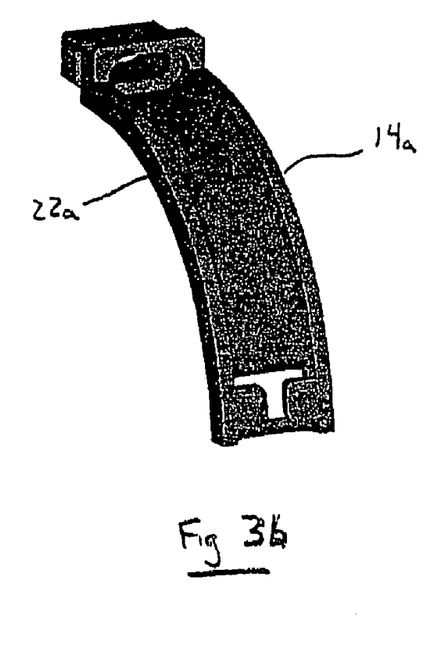

The bend limiter 14 is shown in detail in FIGS. 2(a) & (b) and 3(a) & (b). The bend limiter comprises a crimp portion 21 and an arcuate portion 22. The crimp portion 21 interengages the housing 11 (see FIG. 1a) such that the bend limiter's position with respect to the housing is fixed. The crimp portion 21 also provides a backstop for compressing the resilient means against the ferrule to thereby urge the ferrule 12 forward. The arcuate portion 22 dresses the fiber as it exits the connector. The arcuate portion 22 has a radius no less than the minimum bend radius of the fiber(s) in the ferrule.

Considering the features of the bend limiter in detail, the crimp portion 21 functions like a crimp member of a conventional optical connector. To interengage the housing, the crimp portion 21, in this embodiment, comprises tabs 23 which are received in slots 16 of the housing 11 (see FIG. 1a). This interengagement prevents the bend limiter's rearward movement relative to the housing 11. The crimp portions forward movement relative to the housing is prevented by shoulder 26 which butts against the rear face 17 (see FIG. 1a) of the housing 11. To provide a backstop for the resilient member, the crimp portion 21 has a front face 24 against which the resilient member is configured to seat. The front face 24 has an opening 25 to facilitate passage of the fiber therethrough. It should be understood that, as in a conventional connector, the compressive force of the crimp portion against the resilient member will cause the resilient member to urge the ferrule forward relative to the housing 11. In some embodiments, it may be preferred for the crimp portion 21 to anchor the strength members of a cable to the housing. Such a configuration is well known and may entail, for example, the crimp portion 21 sandwiching the strength members of the fiber cable between it and the inner surface 15 of the housing 11.

The arcuate portion 22 functions like a traditional bend limiter and serves to direct the fiber assembly, which may be, for example, an individual fiber, a group of discrete fibers, a cable or a ribbon, in a desired direction while maintaining a minimum bend radius. The arcuate portions 22 and 22a of the bend limiters in FIGS. 2(a) & (b) and 3(a) & (b) have a 90° arc, meaning that the fiber is directed at a right angle relative to the fiber in the ferrule. Although a 90° arc is generally preferred, it should be understood that the present invention is not limited to such a configuration and arcs of varying degrees such as 45° or 180°, may be used. The minimum bend radius is a function of the fiber and can be determined by those skilled in the art. For example, a single mode fiber typically has a minimum bend radius of about 1 in.

The bend limiters shown in FIGS. 2(a) & (b) and 3(a) & (b) accommodate multifiber fiber assemblies in which two or more of the fibers are arranged in at least one row. The bend limiter 14 of FIGS. 2(a) & (b) has an "east/west" configuration, meaning that the bend of the arcuate portion 22 traverses across the row (i.e., the fibers in a row have different bend radii), while the bend limiter 14a shown in FIG. 3(a) and (b) has a "north/south" configuration, meaning that the bend of the arcuate portion 22a is perpendicular to the row (i.e., all the fibers in the row have the same bend radius). With respect to the east/west configuration of FIGS. 2(a) & (b), it may be preferable to add a twist to the arcuate portion (i.e., configure arcuate portion 22 to be helical) to essentially translate a traverse bend to a perpendicular bend and thereby equalize the bend radii of the fibers of a given row.

To control the fiber in the arcuate portion 22, it may be preferable to employ retaining members 27 on its distal end 28 which hold the fiber(s) against the arcuate portion. Such retaining members 27 are well known in bend limiters.

As mentioned above, an important feature of the present invention is the integration of the crimp member component and the bend limiter component. By combining the two, the connector of the present invention has a reduced effective connector length. Preferably, the distal end extends rearward from the rear face 17 of the housing 11 by a distance of no greater than about 200% of the length of the housing. More preferably, the distal end extends rearward from the rear face of the housing by a distance of no greater than about 150% of the length of the housing. In a preferred embodiment, the distal end extends rearward from the housing by a distance no greater than about 40 mm, and, even more preferably, by a distance of no greater than about 25 mm. In addition to reducing the effective connector length by integrating the crimp member and the bend limiter, a preferred embodiment of the present invention also reduces the length of the housing as well. Accordingly, in a preferred embodiment, the effective connector length is no greater than about 55 mm, and, even more preferably, no greater than about 45 mm.

Figure 4:
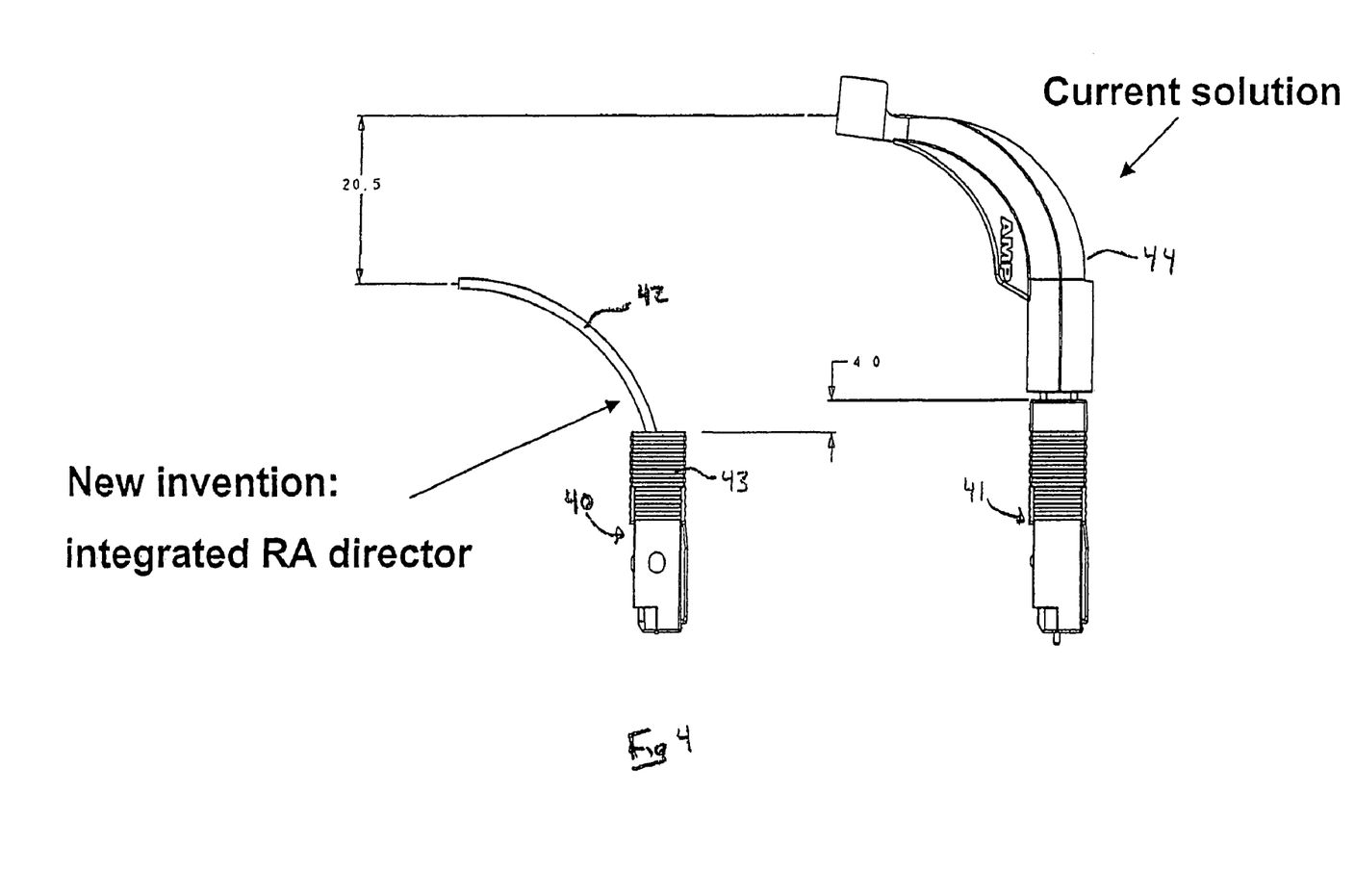
FIG. 4 is a top view of a connector in accordance with the present invention shown in comparison to a connector configured in accordance with the prior art.

The reduced effective connector length is shown relative to a traditional Lightray MPX™ connector in FIG. 4. The connector 40 of the present invention is a Lightray MPX™ connector having an integral bend limiter 42 and a shortened housing 43, while connector 41 is a conventional Lightray MPX™ connector having a discrete bend limiter 44. The dramatic decrease in effective connector length d is apparent. In this particular embodiment, the effective connector length is reduced by 20.5 mm (which includes the 4 mm reduction in housing length). This is a significant reduction which has a profound effect in backplane applications.

FIG. 5 illustrates a connector plug according to the present invention shown in its mated configuration. For explanation purposes, the connector plug 51 containing the bend limiter shall be referred to as the backplane-side connector plug and the connector plug 53 without the bend limiter shall be referred to as the system card side connector plug. It should be understood that some applications may require a bend limiting feature on each side. In the preferred embodiment, the connector plugs are hermaphroditic, and, thus, the system card side plug could be replaced With a plug containing a bend limiting feature if a particular application required such a feature on both sides. The fiber enters the connector through a crimp portion or securing portion which secures the cable in place. A crimp portion 57 can be seen on the system card side connector plug 53. As mentioned above, in the connector of the present invention, the crimp portion of the backplane-side connector plug 51 has been combined with a bend limiter 59 and the connector housing 55 has been shortened.

Figure 6:
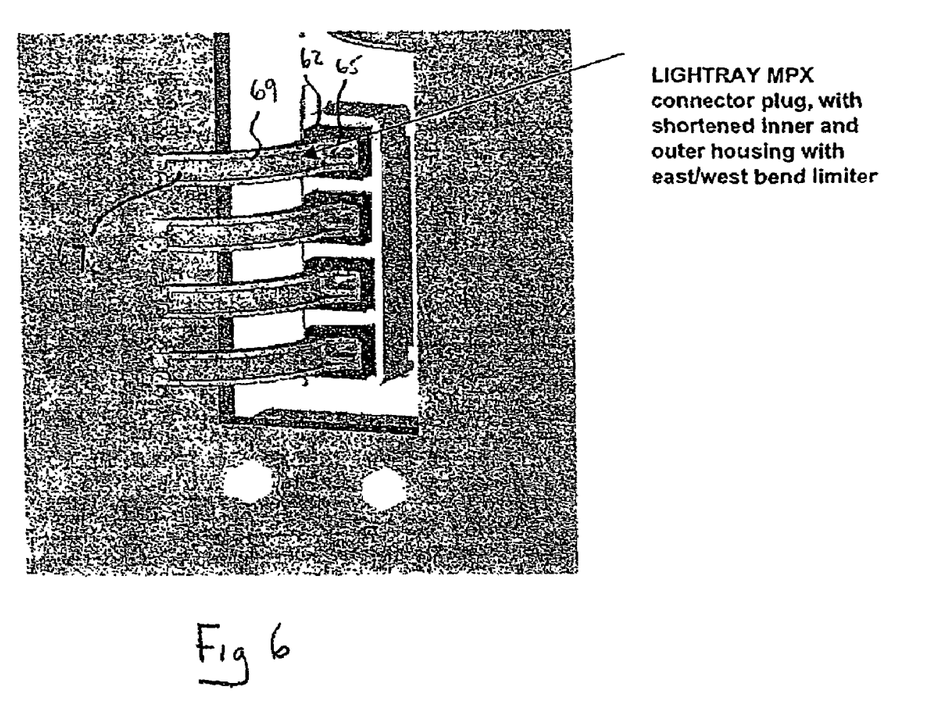
FIG. 6 is a perspective view of a series of connectors of the present invention as viewed from behind the backplane.

FIG. 6 depicts a series of Lightray MPX™ connectors of the present invention as viewed from the rear of a backplane. From this perspective, it can be seen how the present invention allows the fiber to begin bending much closer to the connection point between the backplane-side and system card-side connectors than was possible in the prior art. To effect this, the bend limiter 69 extends into the connector housing 62 and abuts with the ferrule (not shown) in the connector housing 62. This allows the fiber to begin bending immediately upon exiting the ferrule. If appropriate the strength members of the fiber cable are secured to the crimp portion 65 of the bend limiter 69. The cable (not shown) then extends along the arcuate portion 67 of the bend limiter 69, allowing the bend to be completed in a minimum amount of distance behind the backplane. The bend limiters 69 shown in this figure have an east/west configuration, although, alternatively, they may have a north/south configuration as described above.

What is claimed is:

1. A fiber optic connector comprising:
    a housing having a front and rear orientation;
    a ferrule disposed in the front of said housing and containing at least one fiber;
    a resilient member disposed in said housing rearward of said ferrule; and
    a bend limiter disposed in said housing rearward of said resilient member, said bend limiter comprising a crimp portion for interengaging said housing such that said bend limiter' position with respect to said housing is fixed, said crimp portion providing a backstop for compressing said resilient means against said ferrule to urge said ferrule forward, said bend limiter also comprising an arcuate portion for dressing said fiber, said arcuate portion having a radius no less than the minimum bend radius of said fiber.

2. The fiber optic connector of claim 1, wherein said arcuate portion has a 90° arc.

3. The fiber optic connector of claim 1, wherein said arcuate portion has a distal end which extends rearward from said housing by a distance of no greater than about 200% of the length of said housing.

4. The fiber optic connector of claim 3, wherein said distal end extends rearward from said housing by a distance of no greater than about 150% of the length of said housing.

5. The fiber optic connector of claim 1, wherein said arcuate portion has a distal end which extends rearward from said housing by a distance of no greater than about 40 mm.

6. The fiber optic connector of claim 5, wherein said distal end extends rearward from said housing by a distance of no greater than about 25 mm.

7. The fiber optic connector of claim 1, wherein bend limiter comprises a distal end having a retention member for maintaining said fiber in said arcuate portion.

8. The fiber optic connector of claim 1, wherein said fiber is stripped from a cable and said cable is supported by said arcuate portion.

9. The fiber optic connector of claim 1, Wherein said fiber is a portion of a ribbon cable, said ribbon cable being supported by said arcuate portion.

10. The fiber optic connector of claim 1, wherein said arcuate portion is helical.

11. The fiber optic connector of claim 1, wherein said ferrule is an MT-type ferrule.

12. The fiber optic connector of claim 11, further comprising a pin keeper disposed in said housing between said ferrule said resilient member.

13. The fiber optic connector of claim 1, wherein said connector is a Lightray MPX™ connector.

14. The fiber optic connector of claim 1, further comprising an outer housing slidably engaging said housing.

15. The fiber optic connector of claim 1, wherein said ferrule comprises more than one fiber.

\* \* \* \* \*